| United States Patent [19] | [11] 4,319,906 |
|---|---|
| Fix et al. | [45] Mar. 16, 1982 |

[54] METHOD AND APPARATUS FOR PRESS SEALING AN ARC TUBE BODY SECTION

[75] Inventors: Paul Fix, Bath; Kent L. Collins, Hammondsport, both of N.Y.

[73] Assignee: Westinghouse Electric Corp., Pittsburgh, Pa.

[21] Appl. No.: 219,693

[22] Filed: Dec. 24, 1980

[51] Int. Cl.³ .............................................. C03C 27/02
[52] U.S. Cl. .................... 65/59.26; 65/59.28; 65/108; 65/154; 65/155; 65/156; 65/276; 65/280
[58] Field of Search .................... 65/54, 59.26, 59.28, 65/59.32, 59.7, 108, 139, 154, 155, 156, 276, 278, 279, 280, 295

[56] References Cited

U.S. PATENT DOCUMENTS 1,872,070  8/1932  McCabe et al. .................... 65/54

*Primary Examiner*—Richard V. Fisher
*Attorney, Agent, or Firm*—W. D. Palmer

[57] ABSTRACT

A method and apparatus for press sealing a tubular quartz arc tube body section about a ribbon-type metallic seal. The method includes applying different intensities of heat to the quartz arc tube body section to be pressed in such a manner that four portions of the quartz arc tube body section which are located within diametrically opposed quadrant sections are heated to a higher softened-state temperature than those portions of the heated quartz arc tube body which are positioned intermediate the higher-heated quartz arc tube body portions, with the higher-heated quartz arc tube body portions collapsing somewhat due to the surface tension of the softened quartz. Utilizing this method results in an improved press seal.

2 Claims, 13 Drawing Figures

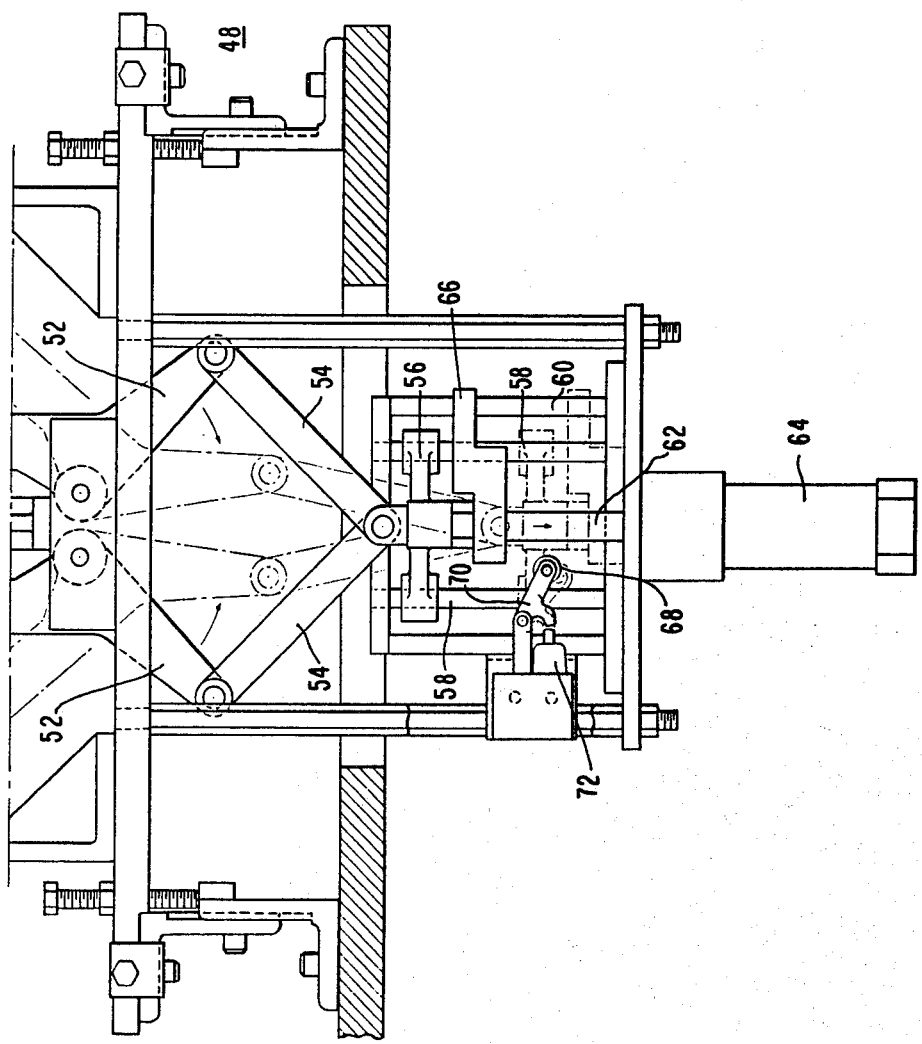

FIG. 6
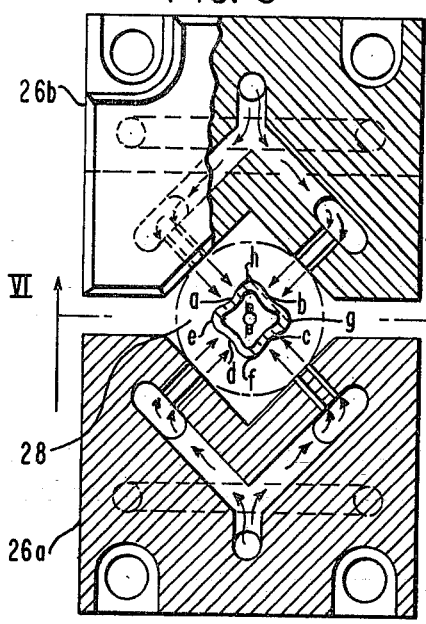
FIG. 8
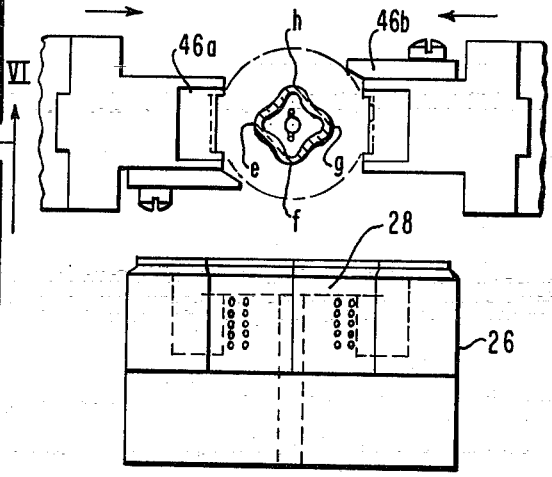
FIG. 7
FIG. 5
PRIOR ART
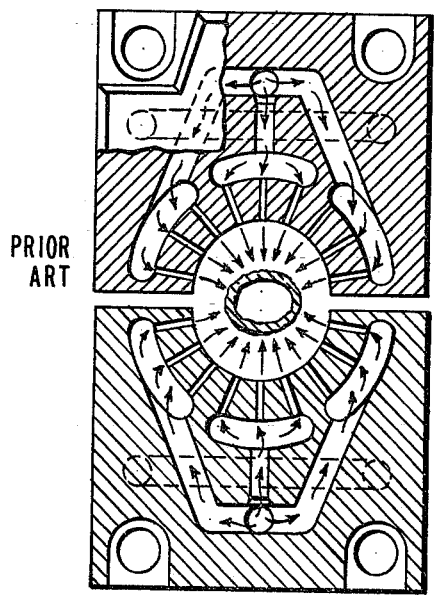
FIG. 10
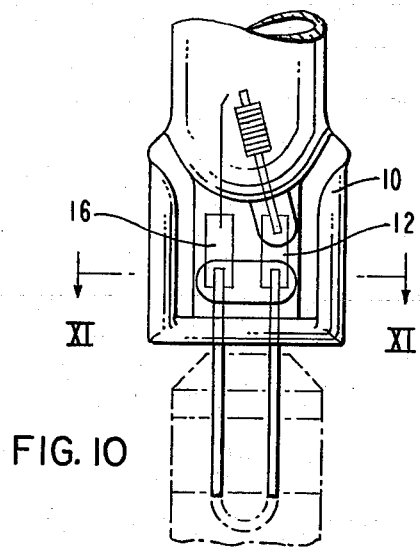
FIG. 11
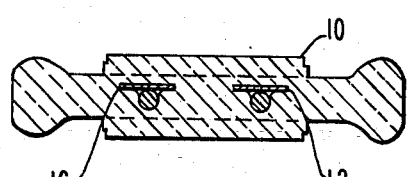

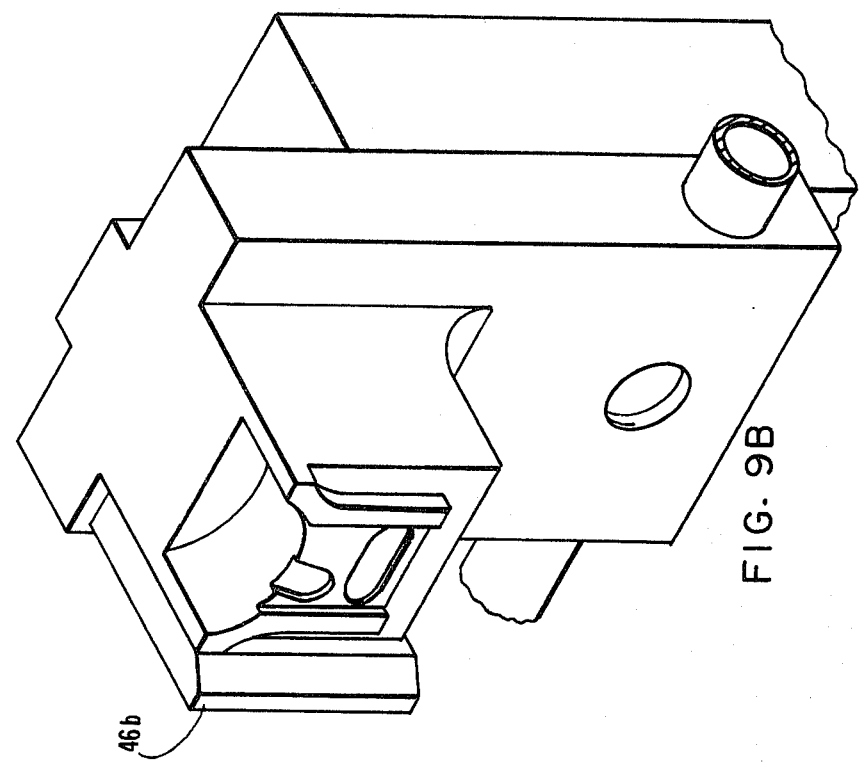
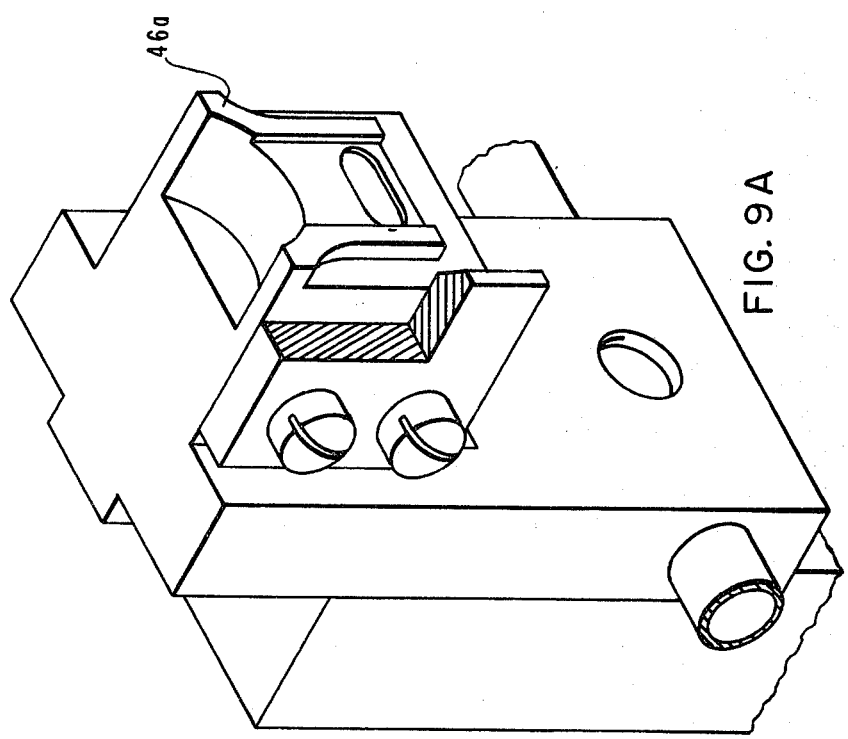

METHOD AND APPARATUS FOR PRESS SEALING AN ARC TUBE BODY SECTION

CROSS-REFERENCE TO RELATED APPLICATIONS

In copending application Ser. No. 219,695, filed concurrently herewith, by J. J. Murphy et al. and assigned to the present assignee, there is described an integral machine for making substantially contaminant free high-intensity discharge arc tubes. The machine uses the heat from the pressing operation to aid in the evacuation and filling of the arc tube.

In copending application Ser. No. 219,713, filed concurrently herewith, by J. J. Murphy and L. D. Estrada and assigned to the present assignee, there is described a rotatable turret having a constant index time and a variable dwell time. The turret is used for the production of worked pieces.

In copending application Ser. No. 219,696, filed concurrently herewith, by J. J. Murphy and assigned to the present assignee, there is described an automatic tipping-off apparatus for hermetically sealing a dosed and otherwise processed arc tube for a high-intensity-discharge arc tube.

In copending application Ser. No. 219,712, filed concurrently herewith, by J. Petro and assigned to the present assignee, there is described a machine parts protecting system for protecting those parts of a machine that may be in close proximity to high temperature flames.

BACKGROUND OF THE INVENTION

This invention relates to a method and apparatus for fabricating high intensity discharge lamps and, in particular, to a method and apparatus for press sealing a tubulated quartz arc tube body section.

High intensity discharge lamps having quartz arc tubes are well known in the art. The arc tubes generally have a tubulated quartz body having electrode assemblies press sealed at opposite ends of the body. It has been the practice to heat the sections of the arc tube body to be sealed with an even heat around the circumference of the arc tube body to a temperature that will permit the quartz to be deformed by a pair of pressing jaws to make the press seal. The electrode assemblies typically include a coiled electrode wound around a rod member which is affixed to one end of a ribbon-type metallic seal. The other end of the ribbon-type metallic seal is affixed to a lead-in wire. It has been found that utilizing the foregoing method of heating the arc tube body section insufficient quartz occasionally results in the press seal area.

SUMMARY OF THE INVENTION

A method concerns press sealing a tubular quartz arc tube body section about a ribbon-type metallic seal means. The method comprises inserting into the arc tube body section to be pressed the ribbon-type metallic seal means which is to be pressed sealed. Applying different intensities of heat to the arc tube body section to be pressed in such manner that four portions of the quartz arc tube body section which are located in diametrically opposed quadrant sections are heated to a higher softened-state temperature than those portions of the heated quartz arc tube body which are positioned intermediate the higher-heated quartz arc tube body portions, with the higher-heated quartz arc tube body portions collapsing somewhat due to the surface tension of the softened quartz. Then applying to the softened quartz arc tube body section a deformation pressure by moving two pressing jaws of predetermined configuration onto two opposite sides of the softened quartz arc tube body section with the motion to the jaws toward one another first contacting oppositely disposed lesser-heated quartz arc tube body portions so that during the pressing action, the jaw-contacted lesser heated quartz arc tube body portions are driven into the higher-heated quartz arc tube body portions, and continuing the pressing action to drive the softened quartz onto the remaining lesser-heated quartz arc tube body portions which are positioned in a line which is normal to the direction of movement of said pressing jaws. An apparatus for press sealing a tubular quartz arc tube body section is also described.

BRIEF DESCRIPTION OF THE DRAWINGS

For a better understanding of the invention, reference may be had to the accompanying drawings, exemplary of the invention, in which:

FIG. 2B is an elevational view showing the lower portion of the pressing means from line II—II in FIG. 2A;

FIG. 5 is a cross sectional plan view of a prior art burner with a section of an arc tube body being heated by the burner;

FIG. 6 is a plan view of the burner means of the present invention, partly in section, heating a section of a quartz arc tube body;

FIG. 7 is an elevational view of one of the burners looking in along line VI—VI in FIG. 6 with the section of the quartz arc tube body not shown;

FIG. 8 is a plan view of the pressing jaws in position prior to pressing the heated quartz arc tube body section;

FIG. 9A is an elevational view of one of the pressing jaws;

FIG. 9B is an elevational view of the other pressing jaw;

FIG. 10 is a sectional elevational view of a pressed quartz arc tube body section; and FIG. 11 is a cross-sectional view of the pressed arc tube body section taken along the line X—X of FIG. 10.

DESCRIPTION OF THE PREFERRED EMBODIMENTS

Figure 1:
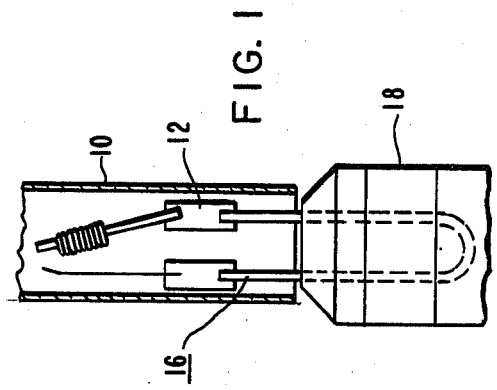
FIG. 1 is an elevational view of an electrode assembly holder, holding a typical high pressure mercury vapor electrode assembly.

There is provided a method of press sealing a tubular quartz arc tube body section 10 about a ribbon-type metallic seal means 12 shown in FIG. 1. An apparatus 14 for press sealing the quartz arc tube body section 10 is shown in FIGS. 2A–10.

Figure 4:
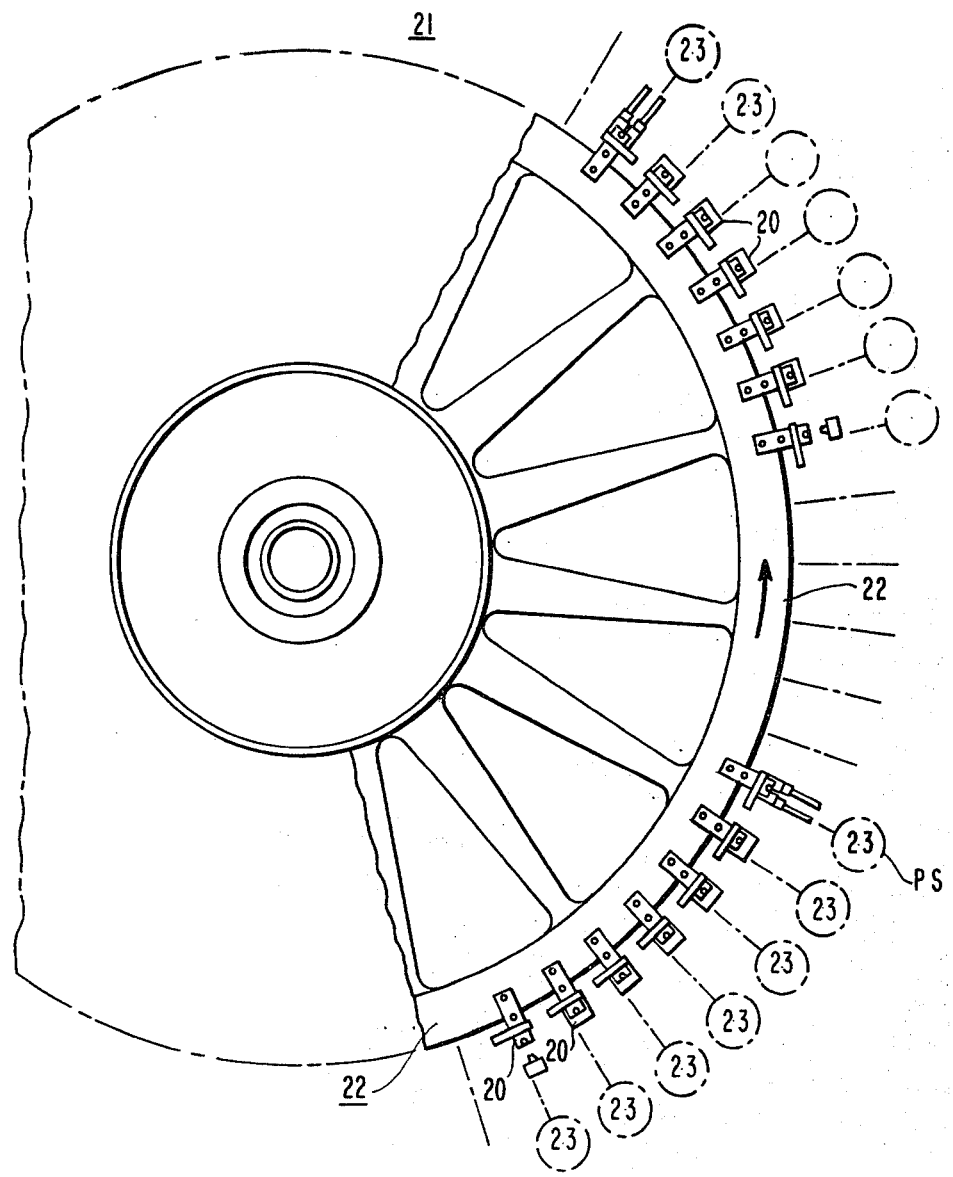
FIG. 4 is a sectional plan view of a turret showing schematically the relationship of the arc tube body holding members to the press sealing apparatus.

The method comprises inserting into the tubular quartz arc tube body section 10 to be pressed the ribbon-type metallic seal means 12 which is to be pressed sealed. In this embodiment, an electrode assembly 16 is inserted by hand into electrode assembly holder 18 which is a part of the arc tube body holding member 20 shown in FIG. 2A. Typically, arc tube fabricating machine 21 comprises a plurality of body holding members, 20 mounted on a turret 22 as shown in FIG. 4. The arc tube fabricating machine 21 also includes stationary operating stations 23 in close proximity to the arc tube body holding members 20. The turret 22 is moved so that each arc tube body holding member 20 is indexed from one operating station to the next in a stop-and-go fashion.

In this embodiment, the press sealing apparatus 14 (other than the body holding member 20) is located at the operating station identified as 'PS'.

The electrode holding member 18 is mounted on arm 24. The arm 24 connects to wheel 25 which rides on track 27. The track 27 causes the arm 24 to raise and lower the electrode holding member 18 in a predetermined fashion such that when the arc tube body holding member 20 is indexed to the 'PS' operating station the arm 24 raises the holding member 18 to insert the electrode assembly 16 into the arc tube body section 10.

Once the electrode assembly 16 has been inserted into the body section 10, different intensities of heat are applied to the quartz body section to be pressed by the burner means 26. The quartz body section 10 to be pressed is heated in such a manner that four portions, labeled a, b, c and d, in FIG. 6 are heated to a higher softened-state temperature such as 1800° C. then those portions, labeled e, f, g and h, of the heated quartz body section which are positioned intermediate the higher-heated quartz body portions. The higher-heated quartz body portions a, b, c and d collapse somewhat due to the surface tension of the softened quartz. The heating method of the present invention may be compared to the heating method of the prior art shown in FIG. 5 where the arc tube body section is heated by the burners substantially evenly around its circumference. The burner means 26 shown in FIG. 6 has an arc tube body section enclosure aperture 28 passing therethrough. The aperture 28 as shown in FIG. 6 is formed by the V-shaped notches in the burner heads in this embodiment. Of course, the present invention is not limited to this burner shape but is applicable to any shape of burner that supplies heat to the arc tube body section as described.

Figure 2A:
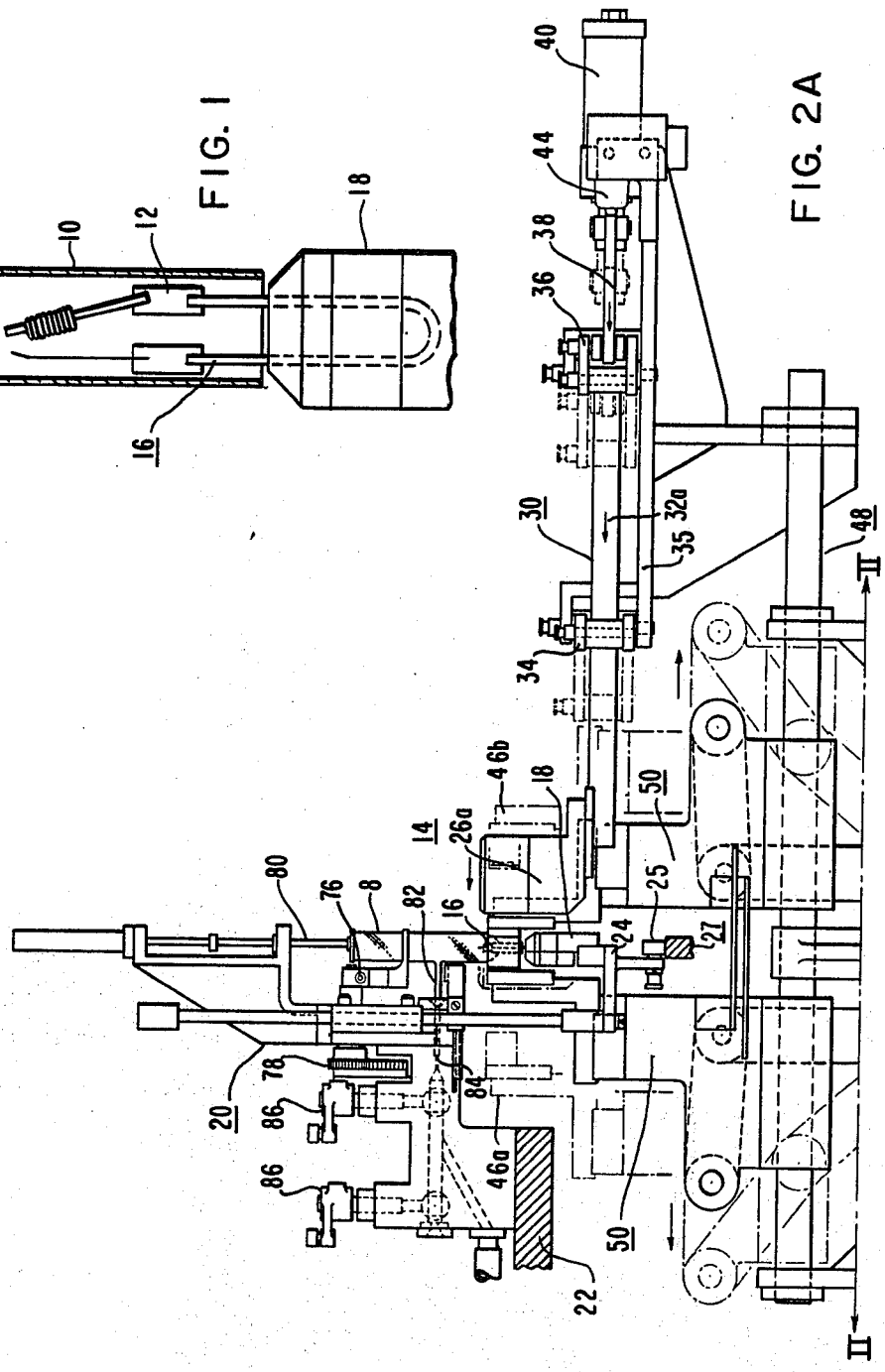
FIG. 2A is an elevational view of a tubulated quartz arc tube body holding member in position with the top portion of the pressing means and the arc tube body section positioning means.
Figure 3:
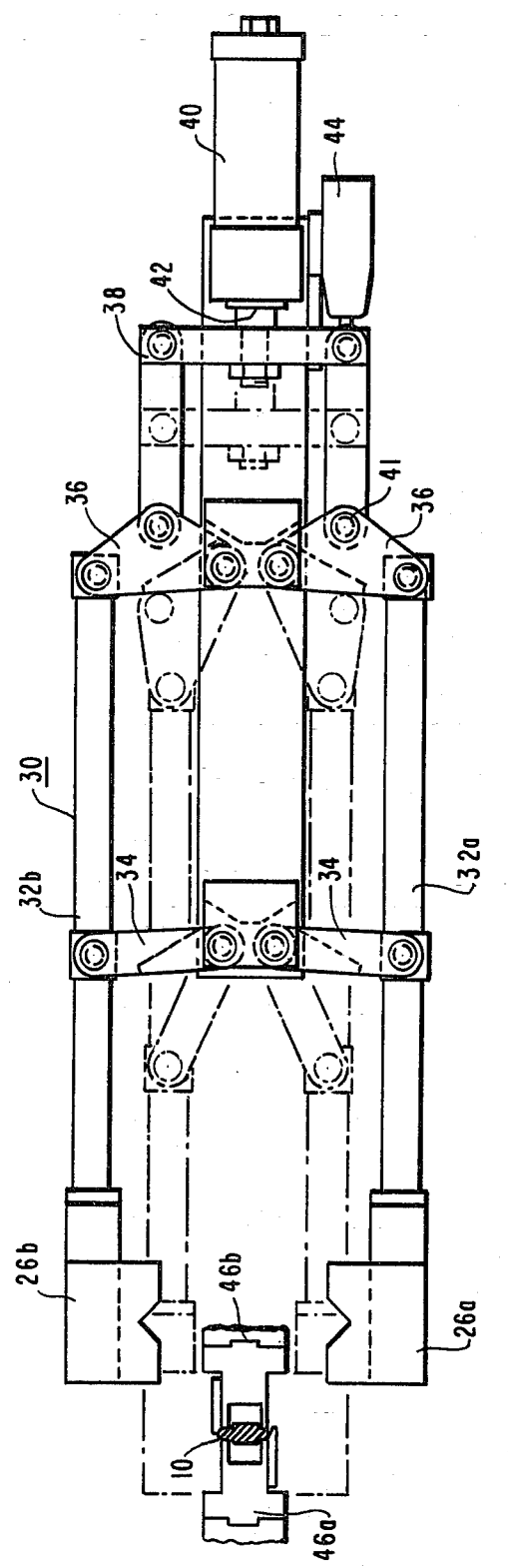
FIG. 3 is a plan view of the burner positioning means in position relative to the arc tube body section and the pressing means.

As shown in FIGS. 2A and 3, the apparatus 14 also includes positioning means 30 for positioning the arc tube body section enclosure aperture 28 of the burner means 26 around the arc tube body section 10 for a predetermined time such as 15 seconds sufficient to collapse somewhat the higher-heated portions a, b, c and d of the arc tube body section 10.

With reference to FIG. 3, positioning means 30 includes left burner connecting arm 32a connecting to burner 26a and right burner connecting arm 32b connecting to burner 26b. The connecting arms 32a, 32b are hinged near the centers thereof by pivot arms 34 which are anchored to base 35. Triangular members 36 connect to the ends 37 of the burner connecting arms 32a, 32b and are pivotally anchored at first corners 38 to base 35. The triangular members 36 are pivotally anchored at second corners 41 to connecting arm 39. The connecting arm 39 is attached to air cylinder 40 by piston 42. Upon the cylinder 40 being energized, piston 42 causes the positioning means to position the burners 26a, 26b around the tubulated body section 10. Microswitch 44 deenergizes the cylinder 40 upon connecting arm 38 striking the switch 44.

Once the softened quartz body section 10 is heated as described a deformation pressure of 20 pounds is applied to the section 10 by moving two pressing jaws 46a, 46b of predetermined configuration such as shown in FIGS. 9A and 9B. The jaws 46a, 46b are caused to move on to two opposite sides of the softened quartz arc tube body section 10 as shown in FIG. 8 with the motion to the jaws 46a, 46b toward one another first contacting oppositely disposed lesser heated quartz body portions e and g so that during the pressing action, the jaw-contacted lesser heated quartz body portions, e.g. are driven into the higher heated quartz body portions a, b, c and d. The pressing action is continued so that the higher-heated quartz body portions a, b, c and d are driven on to the remaining lesser-heated quartz body portions f and h which are positioned in a line which is normal to the direction of the movement of the pressing jaws 46a, 46b.

A preferred pressing means 48 is shown in FIGS. 2A and 2B the pressing means 48 includes the pressing jaws 46a, 46b. The pressing jaws 46a, 46b are connected to the carriages 50. The carriages 50 connect to levers 52. The levers 52 connect to the links 54 which are connected to guide block 56. The guide block 56 rides on guide posts 58 which are affixed to support 60. The guide block 56 is connected to piston 62 of air cylinder 64. When the air cylinder is actuated upon the arc tube body section 10 being heated as described, the air cylinder 64 causes piston 62 to move the pressing jaws 46a, 46b to press the quartz arc tube section 10 as shown in FIG. 2A and FIG. 3. After the quartz arc tube section 10 has been pressed, the piston retracks in the direction indicated in FIG. 2B causing guide block 56 to slide back on the guide post 58 to the position shown by the dashed lines moving tie bar 66 with it. When the guide block 56 touches roller 68 microswitch arm 70 is forced against the pressing microswitch 72, thereby deactivating the air cylinder 64. Tie bar 66 simultaneously strikes back plate 74 thereby acting as a positive stop as shown by the dashed lines in FIG. 2B.

The arc tube body holding member 20 as shown in FIG. 2A also includes tubulated body clamp 76 for holding the tubulated body 8 in position. The clamp 76 is movable by gears 78 to open until an arc tube body is placed in the holding member 20 and the clamp 76 closes to hold the arc tube body securely. Stopper assembly 80 helps maintain the desired atmosphere within the tubulated body 8 during fabrication. Such assemblies are generally known in the art. The exhaust tubulation 82 is held by the exhaust head 84. The exhaust head 84 has valves 86 which allow the arc tube body 8 to be evacuated and filled with the desired atmosphere as is well known in the art.

What we claim is:

1. The method of press sealing a tubular quartz arc tube body section about a ribbon-type metallic seal means, which method comprises:
   inserting into said arc tube body section to be pressed, said ribbon-type metallic seal means which is to be press sealed;
   applying different intensities of heat to said arc tube body section to be pressed in such a manner that four portions of said arc tube body section which are located within diametrically opposed quadrant sections are heated to a higher softened-state temperature than those portions of said heated arc tube body section which are positioned intermediate the higher-heated quartz body portions, with the higher-heated quartz body portions collapsing somewhat due to the surface tension of the softened quartz; and applying to said softened quartz arc tube body section a deformation pressure by moving two pressing jaws of predetermined configuration onto two opposite sides of said softened quartz body section with a motion to the jaws toward one another first contacting oppositely disposed lesser-heated quartz body portions so that during the pressing action, the jaw-contacted lesser-heated quartz body portions are driven into the higher-heated quartz body portions, and continuing the pressing action to drive the softened quartz onto the remaining lesser-heated quartz body portions which are positioned in a line which is normal to the direction of the pressing jaws.

2. An apparatus for press sealing a tubular quartz arc tube body section about a ribbon-type metallic seal means, said apparatus comprising:

means for inserting into said arc tube body portion to be pressed said ribbon-type metallic seal means which is to be press sealed;

burner means having an arc tube body section enclosure aperture passing therethrough, said aperture having diametrically opposed quadrant sections, each quadrant section supplying a higher heat intensity than those portions of said arc tube body enclosure aperture which are positioned intermediate said higher-heated quadrant sections;

means for positioning said arc tube body enclosure aperture of said burner means around said arc tube body section for a predetermined time sufficient to collapse somewhat the higher-heated portions of said arc tube body sections; and means for pressing said heated arc tube body section, said pressing means comprising two pressing jaws of predetermined configuration, each positioned on opposite sides of said heated arc tube body section and in line with one of the lesser-heated portions of said arc tube body section and jaw movement means for moving said pressing jaws toward one another to first contact oppositely disposed lesser-heated quartz arc tube body portions, so that during the pressing action, the jaw-contacted lesser-heated quartz arc tube body portions are driven into the higher-heated quartz arc tube body portions, and then the softened quartz is driven onto the remaining lesser-heated quartz arc tube body portions which are positioned in a line which is normal to the direction of the movement of said pressing jaws.

* * * * *